(12) United States Patent
Rostron et al.

(10) Patent No.: US 11,791,622 B2
(45) Date of Patent: Oct. 17, 2023

(54) TIME-ADMITTANCE FAULT DETECTION AND ISOLATION SYSTEM

(71) Applicant: Southern States, LLC, Hampton, GA (US)

(72) Inventors: Joseph R Rostron, Hampton, GA (US); Jiyuan Fan, Hampton, GA (US)

(73) Assignee: SOUTHERN STATES, LLC, Hampton, GA (US)

( * ) Notice: Subject to any disclaimer, the term of this patent is extended or adjusted under 35 U.S.C. 154(b) by 21 days.

(21) Appl. No.: 17/741,502

(22) Filed: May 11, 2022

(65) Prior Publication Data

US 2022/0376491 A1 Nov. 24, 2022

Related U.S. Application Data

(60) Provisional application No. 63/191,304, filed on May 20, 2021.

(51) Int. Cl.
*H02H 7/22* (2006.01)
*H02H 1/00* (2006.01)

(52) U.S. Cl.
CPC .......... *H02H 7/222* (2013.01); *H02H 1/0007* (2013.01)

(58) Field of Classification Search
CPC ........ H02H 1/0007; H02H 7/222; H02H 7/26; H02H 3/027; H02H 3/40
See application file for complete search history.

(56) References Cited

U.S. PATENT DOCUMENTS 9,581,642 B2 * 2/2017 Song ..................... G01R 31/311
10,481,186 B2 * 11/2019 Keister ................ H05K 9/0081
(Continued)

FOREIGN PATENT DOCUMENTS

CA 2776261 4/2011

OTHER PUBLICATIONS

Usama "A Comprehensive Review on Protection Strategies to Mitigate the Impact of Renewable Energy Sources on Interconnected Distribution Networks", 2021 IEEE. Retrieved from Internet:<https://ieeexplore.ieee.org/stamp/stamp.jsp?arnumber=9361657> (Year: 2021).*

(Continued)

*Primary Examiner* — Jared Fureman
*Assistant Examiner* — Nicolas Bellido
(74) *Attorney, Agent, or Firm* — Mehrman Law Office; Michael J. Mehrman

(57) ABSTRACT

A time-admittance fault detection and isolation system includes a series of time-admittance switches spaced apart along the power line, each including a respective time-admittance function. Together, the time-admittance functions define a cascade trip sequence in a downstream-to-upstream direction, which autonomously causes a closest upstream time-admittance switch to a fault to trip to isolate the fault on an upstream side of the fault without communication with the time-admittance switches. The fault detection and isolation system may also include a radio communicating a trip signal from the closest upstream time-admittance switch to the fault to a closest downstream time-admittance switch to the fault. The trip signal causes the closest downstream time-admittance switch to the fault to trip to isolate the fault on a downstream side of the fault. A tie switch closes to back-feed a portion of the electric power line downstream from the closest downstream time-admittance switch to the fault.

15 Claims, 16 Drawing Sheets

(56) References Cited

U.S. PATENT DOCUMENTS

| | | | | |
|---|---|---|---|---|
| 10,698,010 B2* | 6/2020 | Keister | ............. | G01R 19/2513 |
| 2012/0330582 A1* | 12/2012 | Wiszniewski | ......... | H02H 3/307 |
| | | | | 702/58 |
| 2022/0123589 A1* | 4/2022 | Fan | .................... | H02J 3/00125 |

OTHER PUBLICATIONS

Dewadasa "An inverse time admittance relay for fault detection in distribution networks containing DGs", 2009 IEEE. Retrieved from Internet:< https://ieeexplore.ieee.org/stamp/stamp.jsp?arnumber=5396204> (Year: 2009).*

Dewadasa, Manjula and Ghosh, Arindam and Ledwich, Gerard (2009), An inverse time admittance relay for fault detection in distribution networks containing DGs, TENCON 2009 IEEE Region 10 Conference, Nov. 23-26, 2009, Suntec International Convention and Exhibition Centre, Singapore.

* cited by examiner

TIME-ADMITTANCE FAULT DETECTION AND ISOLATION SYSTEM

REFERENCE TO RELATED APPLICATION

This application claims priority to U.S. Provisional Pat. App. Ser. No. 63/191,304 filed May 20, 2021, which is incorporated by reference.

TECHNICAL FIELD

The present invention is directed to electric power systems and, more particularly, to time-admittance fault detection and isolation system for inverter-limited faults.

BACKGROUND

Fault detection, isolation and service restoration (also referred to more compactly as "fault isolation" or "sectionalizing") is one of the most important tasks in electric power operations. Using automation to improve the reliability and operation of the transmission and distribution electric power grid is a top industry focus known as the "smart grid." Developing fast and reliable fault isolation systems that minimize the number of customers affected by power outages, and the duration of those outages, is one of the most important tasks in electric power automation and management. Conventional approaches for sectionalizing power circuits were designed for large, central-station power generation plants interconnected by a network of generally passive transmission and distribution lines to deliver the power downstream from the generating plants to the loads. The control schemes designed for this central-station paradigm are becoming increasingly unsatisfactory as electric transmission and distribution networks become increasingly active due to increasing penetration of distributed or load-side power generation resources, such as solar panels, wind turbines, fuel cells, diesel generators, gasoline generators and the like. Additional challenges arise for distributed generation resources utilizing electronic inverters, such as solar, wind, fuel cell, battery and other distributed generators.

Conventional fault detection and isolation techniques utilize systems of fuses, breakers, sectionalizing switches, and other reclosers to detect and respond to high-current faults resulting primarily from lightning and line faults. Large spinning generators exhibit significant inertia allowing them to produce high fault currents in response to line faults, typically an order of magnitude higher than the rated line current. The ability of conventional highly inertial power systems to generate high fault currents was long considered to be the prevailing system condition for designing high-current fault detection and isolation systems.

The fault detection and isolation challenges are quite different, however, for microgrids powered by distributed generation resources connected through electronic inverters, such as solar, wind, fuel cell, battery and other distributed generators. In general, electronic inverters are intrinsically limited to producing fault currents under about two times their rated current, which is well below the fault current levels detected by conventional high-current fault detection and isolation equipment. Inverter-limited line faults can therefore go undetected by the conventional high-current fault detection and isolation equipment. In the absence of effective fault detection and isolation, an inverter-limited fault can cause the generator to drop offline while providing no indication of the location of the fault causing the outage. This can result in a difficult and lengthy power restoration process.

The electric power industry therefore has a continuing need for new and more effective, economic, reliable and safe smart grid techniques. More specifically, there is a continuing need fault detection and isolation systems for inverter-limited faults occurring in microgrids relying on power generators connected to the microgrid through electronic inverters.

SUMMARY

The present invention solves the problem described above through a fault detection and isolation system for detecting and isolating inverted-limited faults occurring on an electric power line extending downstream from an upstream inverter-limited power source. The system includes a series of time-admittance switches spaced apart along the power line. Each time-admittance switch includes a respective time-admittance function. Together, the time-admittance functions define a cascade trip sequence for the time-admittance switches in a downstream-to-upstream direction. The cascade trip sequence autonomously causes a closest upstream time-admittance switch detecting an inverter-limited fault to trip to isolate the fault on an upstream side of the fault without communication with the time-admittance switches.

The fault detection and isolation system may also include a radio for communicating a trip signal from the closest upstream time-admittance switch to a closest downstream time-admittance switch. The trip signal causes the closest downstream time-admittance switch to trip to isolate the fault on a downstream side of the fault. In addition, a tie switch may close to back-feed a portion of the electric power line downstream from the closest downstream time-admittance switch to the fault, which is isolating the fault on the downstream side of the fault.

It will be understood that specific embodiments may include a variety of features in different combinations, and that all of the features described in this disclosure, or any particular set of features, needs to be included in particular embodiments. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DESCRIPTION OF ILLUSTRATIVE EMBODIMENTS

Figure 1:
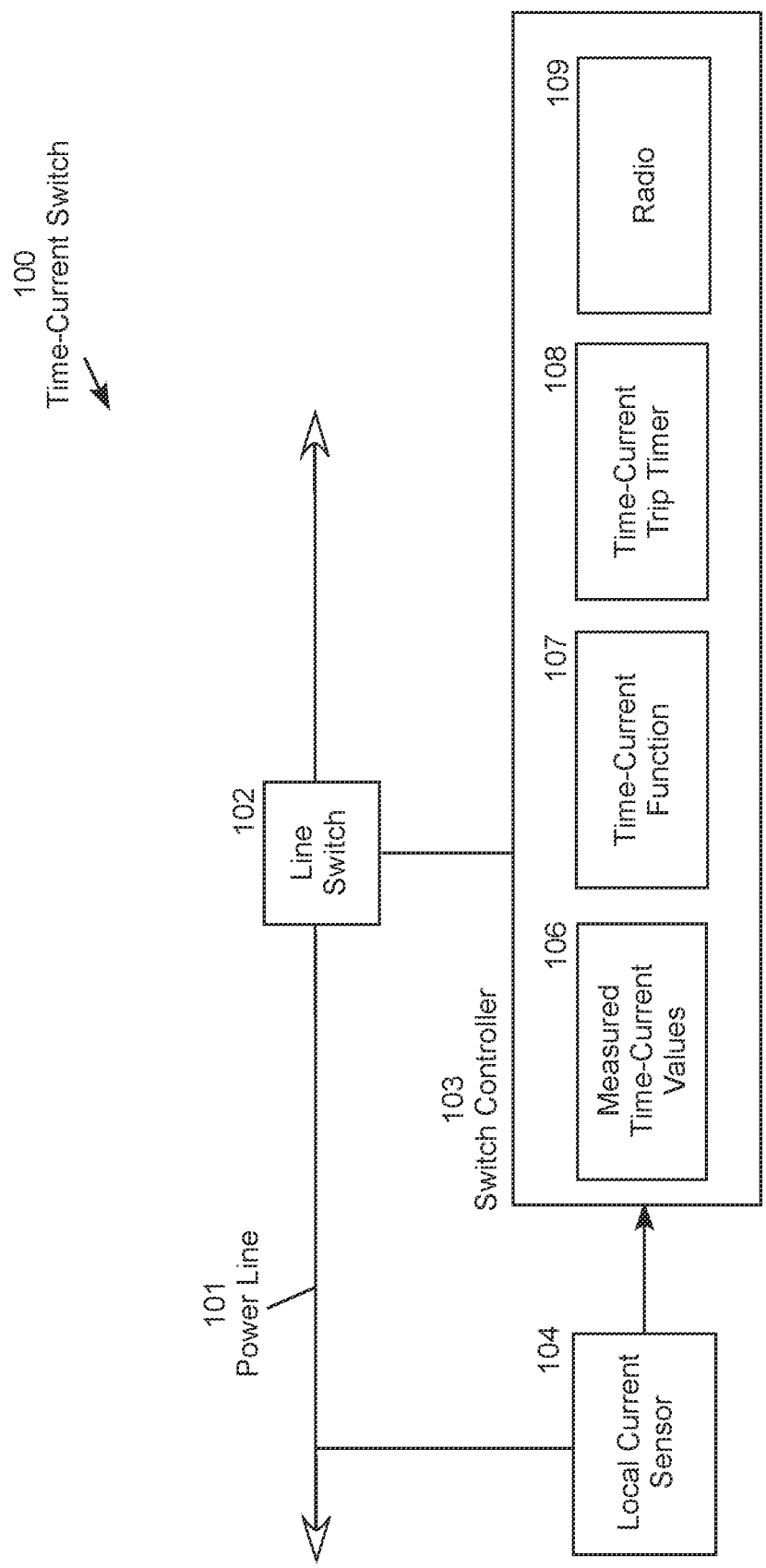
FIG. 1 (prior art) is a conceptual diagram of a conventional time-current switch for detecting and isolating high-current faults.

Embodiments of the present invention solve the problem described above through a time-admittance fault detection and isolation system utilizing a time-admittance switch (TAS), rather than a conventional time-current switch, to detect and respond to line faults on microgrids where the fault currents generated by the power sources are limited by electronic inverters (referred to as "inverter-limited faults"). The time-admittance switch detects and isolates inverter-limited faults occurring on microgrids relying on distributed generators, such as solar, wind, fuel cell and battery resources, connected to the microgrid through electric inverters, that typically go undetected by conventional high-current fault detection and isolation equipment. A TAS radial system utilizes a time-admittance cascade trip sequence in a downstream-to-upstream direction to autonomously cause the closest upstream time-admittance switch detecting an inverter-limited fault to trip to isolate the fault without communication with the time-admittance switches.

The TAS radial system forms a building block for constructing a TAS loop system including two TAS radial systems connected in a loop configuration through a normally-open tie switch. The first TAS radial system isolates an inverter-limited fault through a first TAS operation tripping the closest time-admittance switch upstream from the fault. This switch communicates a peer-to-peer trip signal to the next switch in the downstream direction, which is the closest time-admittance switch downstream form the fault. The trip signal causes the closest downstream time-admittance switch to trip to isolate the fault on the downstream side of the fault. This isolates the fault between the closest upstream TAS and the closest downstream TAS, minimizing the portion of the power line affected by the fault. A tie switch then closes to back-feed the portion of the electric power line downstream from the closest downstream time-admittance switch to restore power to that portion of the microgrid until the fault is cleared.

The TAS radial system and TAS loop system form building blocks for constructing more sophisticated TAS systems and operating procedures, which can become highly sophisticated, as the industry has developed for sectionalizing systems based on high-current fault detection and isolation equipment. In general, once the basic sectionalizing procedures for inverter-limited fault are in place for radial and tie-switch connected loop configurations, time-admittance procedures can be developed to implement more sophisticated sectionalizing procedures similar to those originally designed for high-current detection and isolation equipment, allowing these procedures to be used for inverter-limited faults occurring in microgrids relying on inverter-limited power generators connected to the microgrid through electronic inverters. For example, U.S. Pub. 2022-0123589, which is incorporated by reference, describe sophisticated fault detection and isolation techniques developed for high-current faults. Similar sectionalizing techniques can generally be implemented for inverter-limited microgrids by replacing or upgrading the high-current fault detection and isolation equipment with the time-admittance fault equipment described in this disclosure. By developing the basic sectionalizing procedures for inverter-limited fault for radial and tie-switch connected loop configurations described below, the present disclosure lays the foundation for these and other more sophisticated sectionalizing techniques for inverter-limited microgrid power systems.

FIG. 1 (prior art) is a conceptual diagram of a conventional time-current switch 100 for detecting and isolating high-current faults. Although the typical time-current switch includes a wide range of settings and functionality, only those features relevant to the present disclosure are described to avoid cluttering the disclosure with unnecessary description. In general, it will be understood that the time-current switch 100 includes trip points that can be preset, received, or computed to coordinate operation with other switches and system components. Although the trip timer 108 may cause the line switch 102 to open or close, this disclosure only addresses "tripping" the switch open to isolate high-current faults. The time-current switch 100 includes a physical line switch 102, such as feeder breaker, sectionalizing switch, or other recloser connected inline to a power line 101. The time-current switch 100 also includes a switch controller 103 including a microprocessor, power supply, memory storing computer executable instructions, and other components utilized in computerized controllers. The time-current switch 100 also includes a local current sensor 104, such as a current transformer positioned around the power line 101 near the line switch 102, generating local current measurements for the power line. The switch controller 103 receives local current measurements from the local current sensor 104, computes and stores measured time-current values 106. The switch controller 103 includes a predefined time-current function 107 and a time-current trip timer 108. The switch controller 103 uses the measured time-current values 106 and the time-current function 107 to set the trip timer 108 to trip the line switch 102 when the trip timer elapses. Although not strictly necessary, in most cases the time-current switch 100 includes a radio 109 allowing the time-current switch to communicate with a supervisory control system, peer-to-peer communications with other time-current switches, and other system components to coordinate the operation of multiple switches.

Figure 2:
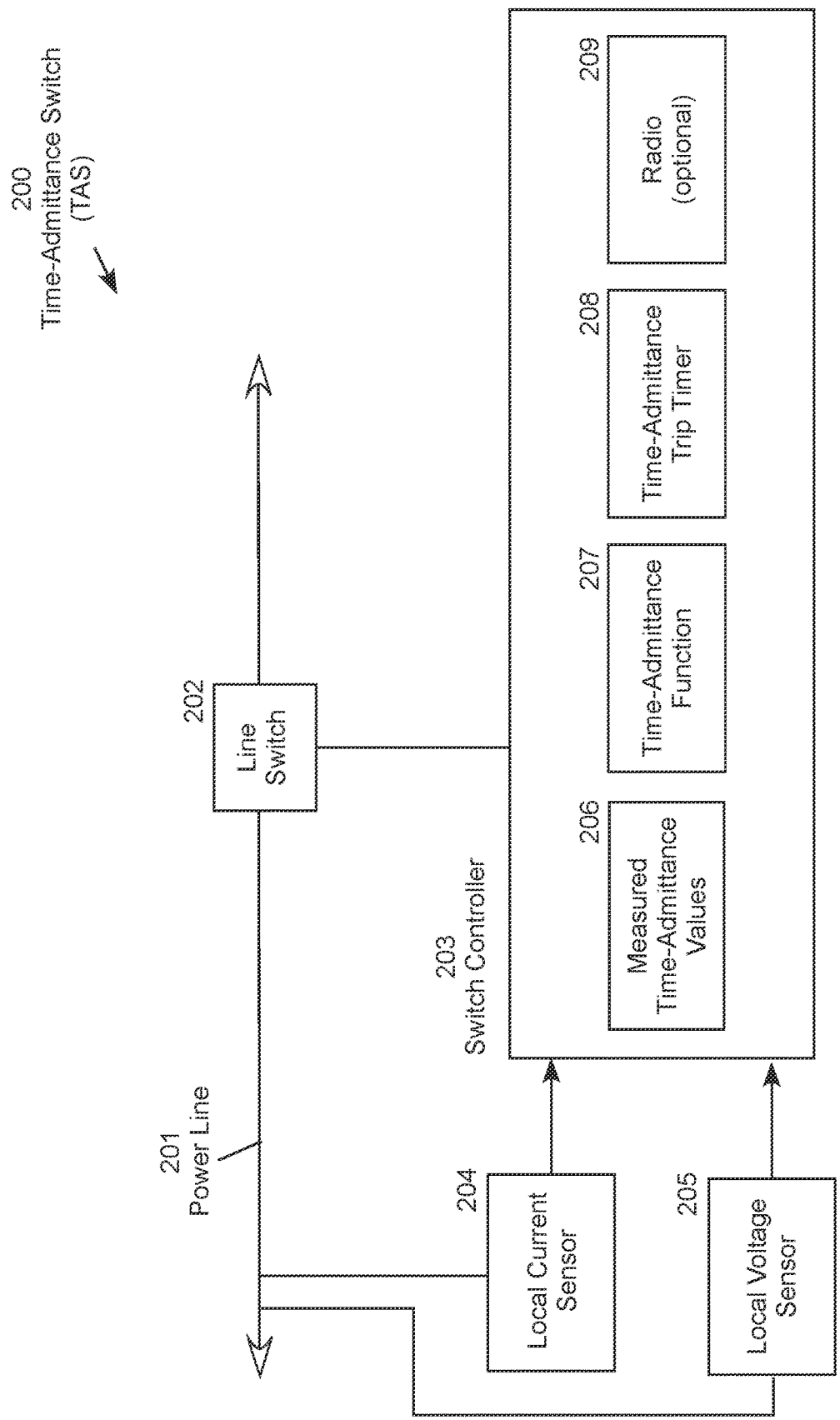
FIG. 2 is a conceptual diagram of a time-admittance switch for detecting and isolating inverter-limited faults.

FIG. 2 is a conceptual diagram of a time-admittance switch (TAS) for detecting and isolating inverter-limited faults. Although the TAS includes a wide range of settings and functionality, only those features relevant to the present disclosure are described to avoid cluttering the disclosure with unnecessary description. In general, the TAS is a three-phase switch with the components and functionality shown in FIG. 2 provided for each electric phase. The present disclosure is applicable to each electric phase independently. After the initial trip in response to detecting a fault, the TAS typically conducts recloser operations, typically three to five times, in an effort to clear the fault. In general, the time-admittance functionality described in the disclosure is implemented in addition to the high-current sectionalizing functionality, allowing the switch to respond to inverter-limited faults in the same way it responds to high-current faults.

The TAS 200 includes a physical line switch 202, such as feeder breaker, sectionalizing switch, or other recloser connected inline to a power line 201. The TAS 200 also includes a switch controller 203 including a microprocessor, power supply, memory storing computer executable instructions, and other components utilized in computerized controllers. The TAS 200 also includes a local current sensor 204 and a local voltage sensor 205. U.S. Pat. Nos. 9,581,642; 10,481, 186 and 10,698,010, which are incorporated by reference, describe examples of local current and voltage sensors. The switch controller 203 receives local current measurements from the local current sensor 204, receives local voltage measurements from the local voltage sensor 205, computes and stores measured time-admittance values 206. The switch controller 203 includes a predefined time-admittance function 207 and a time-admittance trip timer 208. The switch controller 203 uses the measured time-admittance values 206 and the time-admittance function 207 to set the trip timer 208 to trip the line switch 202 when the trip timer elapses. Although the TAS 200 may include a radio, the fault detection and isolation procedures described for a radial TAS system may be implemented autonomously without communication with the time-current switches. Including a radio enables more sophisticated fault isolation processes, including isolating an inverter-limited fault on the upstream and downstream sides of as fault for back-feed operations in tie-switch connected loop configurations.

It will be appreciated that the TAS 200 is basically the same as the time-current switch 100 except that the TAS 200 includes a local voltage sensor 205 and utilizes a time-admittance function 207 rather than the time-current function 107 of the time-current switch 100. In inverter-limited microgrids, line faults typically cause significant voltage drops due the fault current limitation. Addition of the local voltage sensor 205 allows the inverter-limited fault current to be effectively magnified by the voltage drop including the local voltage measurement in the denominator of the admittance quotient (current divided by voltage), which aids in the identification of inverter-limited faults that go undetected by high-current fault detection equipment. Monitoring the voltage and computing the measured admittance values allows the TAS 200 to detect inverter-limited fault that go undetected by the time-current switch 100. On radial line segments, the time-admittance functions are also amenable to cascade trip sequencing in a downstream-to-upstream direction to cause the closest upstream TAS detecting an inverter-limited fault to trip to isolate the fault.

Figure 3:
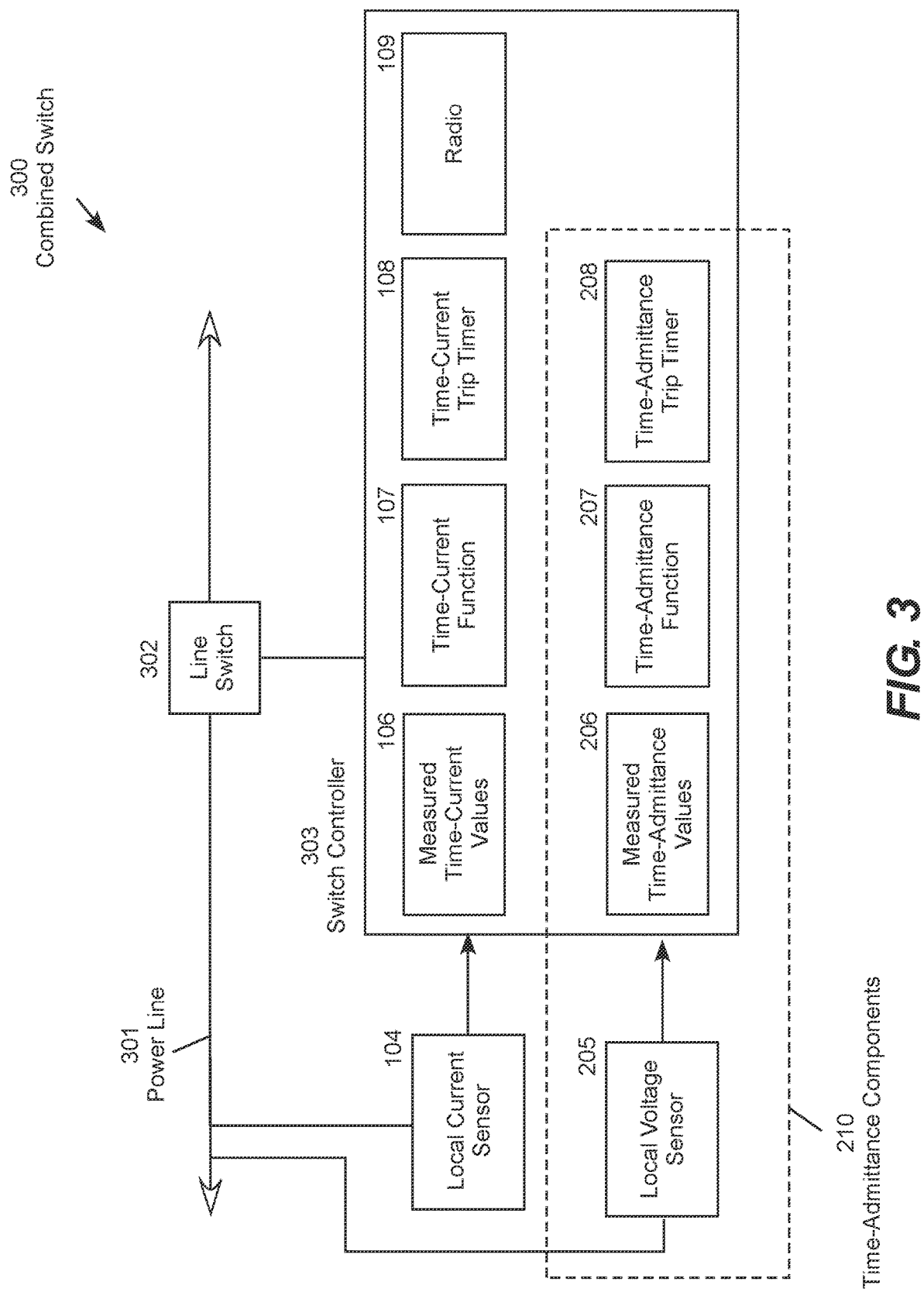
FIG. 3 is a conceptual diagram of a combined switch for detecting and isolating high-current and inverter-limited faults.

A preexisting smart high-current switch can typically be readily upgraded to implement the time-admittance functionality by adding only a voltage sensor and a software upgrade. FIG. 3 is a conceptual diagram of a combined switch 300 for detecting and isolating high-current and inverter-limited faults on a power line 301. The combined switch 300 includes physical line switch 302 connected to the power line 301. The combined switch 300 also includes the local current sensor 104, measured time-current values 106, and time-current function 107, time-current trip timer 108, and radio 109, of the time-current switch 100 described with reference to FIG. 1. The switch controller 303 for the combined switch 303 also includes time-admittance components 210, including the local voltage sensor 205, the measured time-impedance values 206, the time-admittance function 207, and the time-admittance trip timer 208 of the TAS 200 described with reference to FIG. 2. The combined switch 300 can be created as an upgrade to the conventional time-current switch 100 by adding local voltage sensor 205 along with a software upgrade because the measured time-impedance values 206, the time-admittance function 207, and the time-admittance trip timer 208 are software functionality.

Figure 4:
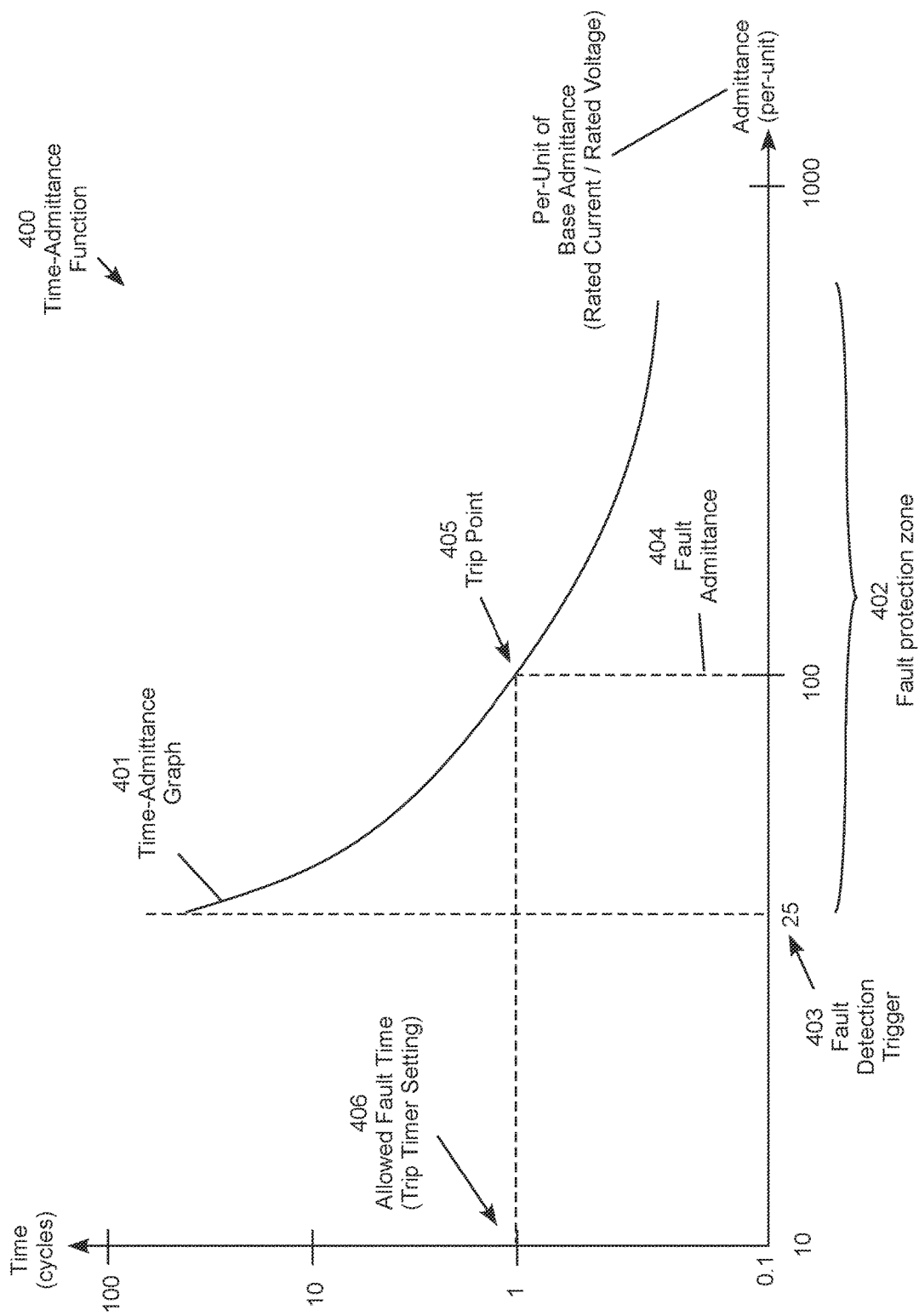
FIG. 4 illustrates a representative time-admittance function.

FIG. 4 illustrates a representative time-admittance function 400 depicted as a time-admittance graph 401. The vertical axis plots time (expressed in cycles, where one cycle is 16.67 milliseconds in a 60 Hz power system, 20 milliseconds in a 50 Hz system) on a log scale, while the horizontal axis plots admittance (inverse impedance) on a log scale expressed as per-unit values of the Base Admittance, where the Base Admittance is defined as the rated line current divided by the rated line voltage. The admittance range of the time-admittance graph 401 defines a fault detection zone 402 with a lower bound reflecting a fault detection trigger 403. The time-admittance switch (TAS) detects an inverter-limited fault by identifying an increase in admittance resulting in a measured fault admittance 404 (referred to as the "fault admittance") falling within the fault protection zone 402, which is equivalent to a measured fault admittance equal to or greater than the fault detection trigger 403. The TAS refers to the time-admittance function 400 to identify a trip point 405 for the detected fault, which corresponds to the measured fault admittance 404 and an allowed fault time 406 for the detected fault. The TAS then sets its trip timer to the allowed fault time 406, which will cause the physical line switch to trip when the detected fault persists for the allowed fault time 406, unless the trip timer is stopped and reset prior to elapsing. In particular, the trip timer will be stopped and reset when the TAS detects that a downstream TAS has tripped to isolate the fault before the trip timer has expired, which occurs when there is a downstream TAS closer to the fault on the upstream side of the fault. The upstream TAS detects the trip of the downstream TAS by detecting a sharp reduction in the measured admittance at the upstream TAS due to the isolation of the fault by the downstream TAS.

To provide a specific example, the TAS detects an inverter-limited fault by identifying an increase in the measured admittance to a fault admittance 404 (100 per-unit admittance), which is greater than the fault detection trigger 403 (25 per-unit admittance) falling within the fault protection zone 402 (admittance at least 25 per-unit). The TAS then refers to the time-admittance function 401 to determine the trip point 405, which corresponds to the allowed fault time 406 (1.0 cycles) for the detected fault. The TAS then sets its trip timer to the allowed fault time 406 (1.0 cycles), which will cause its physical line switch to trip when the fault reaches a duration equal to the allowed fault time 406 (1.0 cycles), unless the trip timer is stopped and reset prior to elapsing. In particular, the trip timer will be stopped and reset when the TAS detect that a downstream switch has tripped first to isolate the fault.

Figure 5:
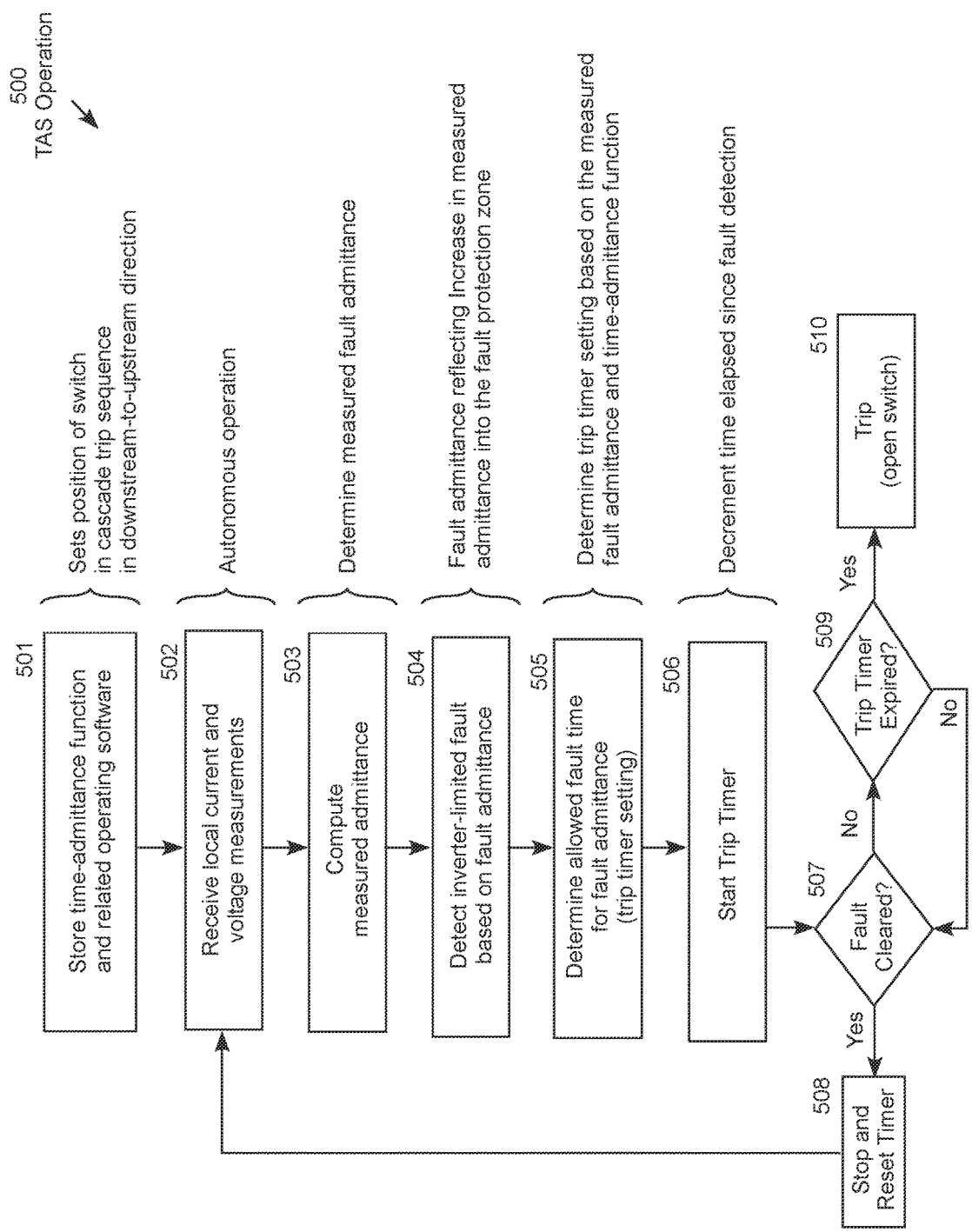
FIG. 5 is a logic flow diagram for operating a time-admittance switch (TAS).

FIG. 5 is a logic flow diagram 500 for a detecting and isolating inverter-limited faults. In step 501, the switch is programmed with a time admittance function and related operating software. The time admittance function sets the position of the TAS in a cascade trip sequence in a downstream-to-upstream direction, which will cause the closest upstream TAS to the fault to trip to isolate the fault on the upstream side of the fault. Step 501 is followed by 502, in which the switch receives local current and voltage measurements. The TAS can operate autonomously to participate in the cascade trip sequence without communications with a supervisory control system or among other switches. Step 502 is followed by 503, in which the TAS computes a measured admittance value, which is the inverse impedance computed by dividing the local current measurement by the local voltage measurement. Step 503 is followed by 504, in which the switch detects an inverter-limited fault by detecting an increase the measured admittance into the fault protection zone, which is referred to as the "fault admittance" in the event of fault detection. Step 504 is followed by 505, in which the switch determines an allowed fault time for the fault admittance (trip timer setting) based on the local current measurement, the local current measurement, and the time-admittance function. Step 505 is followed by 506, in which the TAS starts the trip timer, which decrements the time elapsed from the fault detection. Step 506 is followed by 507, in which the TAS determines whether the fault has been cleared by another downstream TAS that detected the same fault and tripped first.

If the fault has been cleared, the "yes" branch is followed to step 508, in which the TAS stops and resets the trip timer. Step 508 loops to step 502, in in which the switch receives local current and voltage measurements. If the fault has not been cleared, the "no" branch is followed from step 508 to step 509, in which TAS determines whether the trip timer has expired. If the trip timer has not expired, the "no" branch loops to step 507 in which TAS determines whether the fault has been cleared by another switch that detected the same fault tripping first. If the trip timer has expired, the "yes" branch is followed to step 510, in which the TAS trips open.

The TAS operation routine 500 is performed for each TAS autonomously, without communication with the switches, on a radial power line to implement a cascade trip sequence in a downstream-to-upstream direction. It will be appreciated that for a radial power line, all time-admittance switches downstream from a line fault will experience a sharp decrease in current, and therefore a decrease in admittance. Switches downstream from a fault, therefore, not detect the fault. At the same time, all time-admittance switches upstream from the fault will experience a sharp increase in current together with a decrease in voltage producing an increase in the measured admittance into the fault protection zone. As a result, only those switches upstream from a line fault will detect the inverter-limited fault and participate in the cascade trip sequence in response to the fault. While all of the time-admittance switches on the upstream side of the fault detect the fault and initiate their trip timers at essentially the same time, the cascade trip sequence in the downstream-to-upstream direction causes the closest upstream TAS to the fault to trip first to isolate the fault on the upstream side of the fault.

Figure 6:
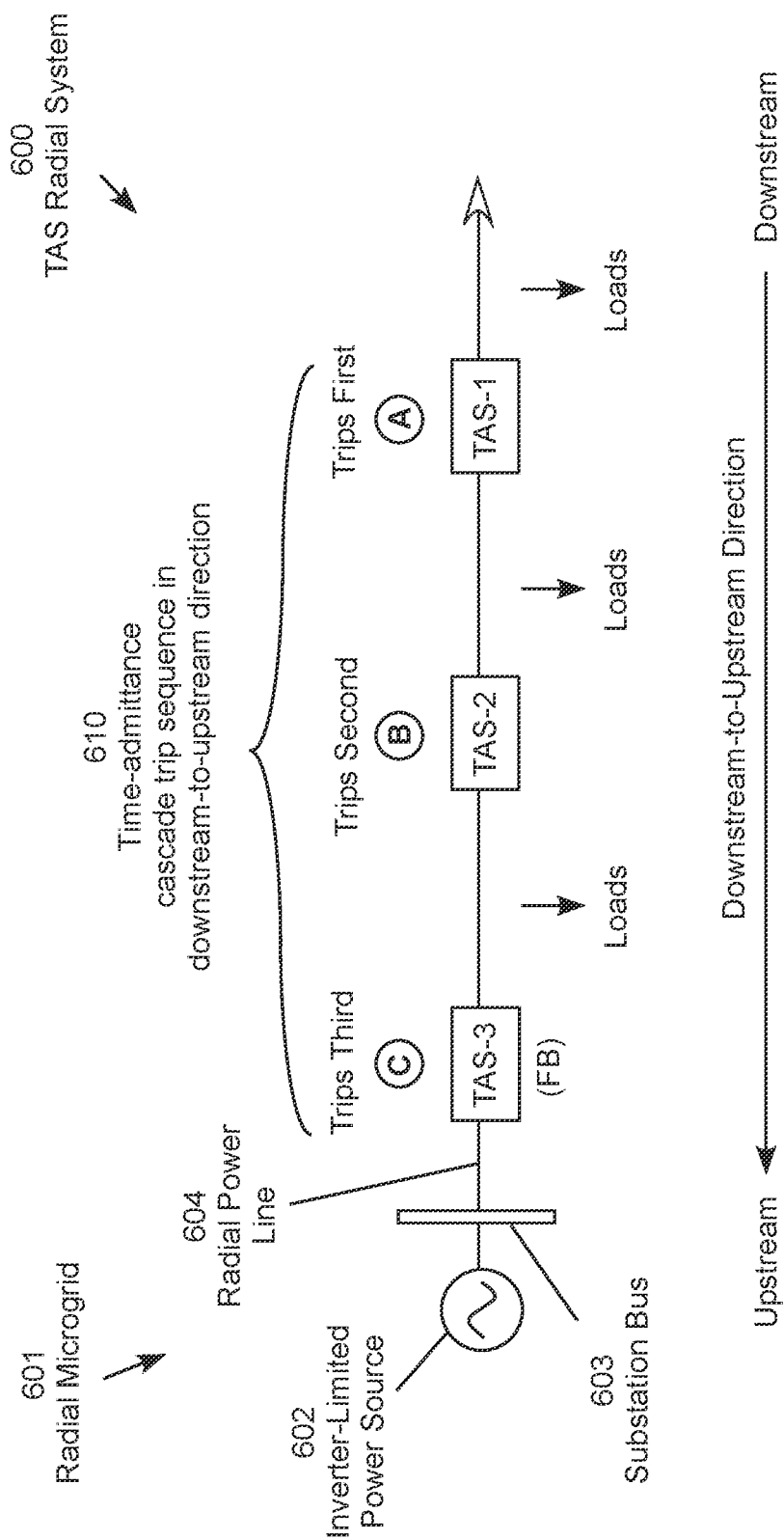
FIG. 6 is a one-line diagram of a TAS radial system.

FIG. 6 is a one-line diagram for a TAS radial system 600 including a radial microgrid 601 including an inverter-limited power source 602 connected to a substation bus 603 feeding the radial power line 604. Three time-impedance switches TAS-3, TAS-2 and TAS-1 are spaced apart on the radial power line 604 in downstream-to-upstream direction. The time-impedance switches are numbered in the downstream-to-upstream order (i.e., TAS-1 furthest downstream) to correspond to the cascade trip sequence. Each switch is configured with the functionality of the recloser switch 200 described with reference to FIG. 2, including local current and voltage sensors, a time-admittance function, and a trip timer. A radio is not required for radial cascade trip sequencing, which operates autonomously without the need for communications with a supervisory control system or between the switches. In this example, the switch TAS-3 is the feeder breaker positioned closest to the power source 602, switch TAS-2 is a first sectionalizing switch located downstream from the feeder breaker, and switch TAS-1 is a second sectionalizing switch located downstream from TAS-2. The radial power line 604 provides electric service to a variety of loads along the power line. In this example, no loads are served upstream from TAS-3, which is the feeder breaker for the power line.

To implement the inverter-limited fault detection and isolation scheme, the switches TAS-3, TAS-2 and TAS-1 are configured with the time-admittance trip sequence 610 indicated by encircled A, B and C spaced apart on the radial power line 604 in the downstream-to-upstream direction corresponding to their physical distance along the radial power line from the inverter-limited power source 602. On a radial power line, only the time-admittance switches upstream from a fault detect the fault, while the time-admittance switches downstream from the fault do not detect the fault. The cascade trip sequence therefore causes the closest upstream switch to the fault to trip first to isolate the fault on the upstream side of the fault. As described in more detail below with reference to FIGS. 12 and 13, the closest upstream switch to the fault (i.e., (the closest switch to the fault on the upstream side of the fault) may send a trip signal to the next switch in the downstream direction, which is the closest switch to the fault on the downstream side of the fault. This switch (the closest switch to the fault on the downstream side of the fault) then trips to isolate the fault on the downstream side of the fault. A tie switch downstream from this switch may then close to back-feed portion of the power line downstream from the isolated fault. It will therefore be appreciated that the cascade trip sequence causing the closest upstream switch to trip first to isolate the fault on the upstream side of the fault, while the power line is in a radial configuration, is a pivotal feature of the microgrid operation allowing full isolation and back-feeding of the power line in the event of an inverter-limited line fault. The fault detection and isolation technique described for this three-switch example can be expanded to incorporate any desired number of switches spaced apart along a radial power line.

Figure 7:
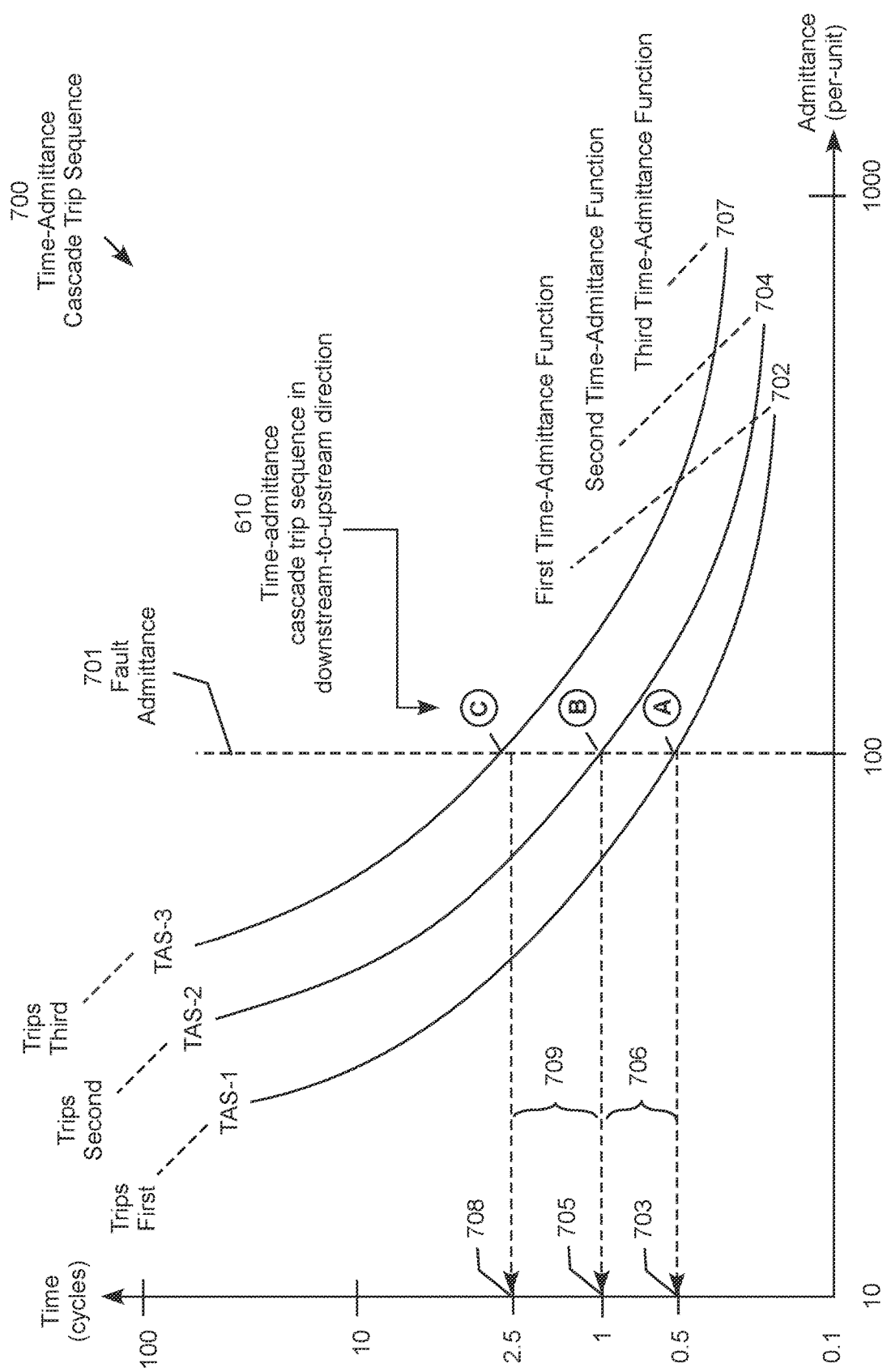
FIG. 7 illustrates time-admittance cascade trip sequence for the TAS radial system.

FIG. 7 is a time-admittance trip sequence graph 700 illustrating the time-admittance cascade trip sequence 610 for the microgrid 600. The time-admittance function 702 for switch TAS-1 is located below the time-admittance function 704 for switch TAS-2, which is located below the time-admittance function 707 for switch TAS-3. An example fault with a measured admittance value 701 (100 per-unit for this example) corresponds to the representative time-admittance trip sequence 610. In this example, the time-admittance function 702 for switch TAS-1 reflects a time value 703 (0.5 cycles, trip point "A" in this example), which is the shortest fault time required for the fault with the measured admittance value 701 to cause a switch in the cascade trip sequence 610 to trip. The time-admittance function 704 for switch TAS-2 reflects a time value 705 (1.0 cycles, trip point "B" in this example) following a first time delay 706 (0.5 cycles in this example). Similarly, the time-admittance function 707 for switch TAS-3 reflects a time value 708 (2.5 cycles, trip point "C" in this example) following a second time delay 709 (1.5 cycles in this example). It will be appreciated that each TAS will actually measure a very slight difference in the measured fault admittance, which can be ignored for the purpose of inverter-limited fault detection and isolation.

Figure 8:
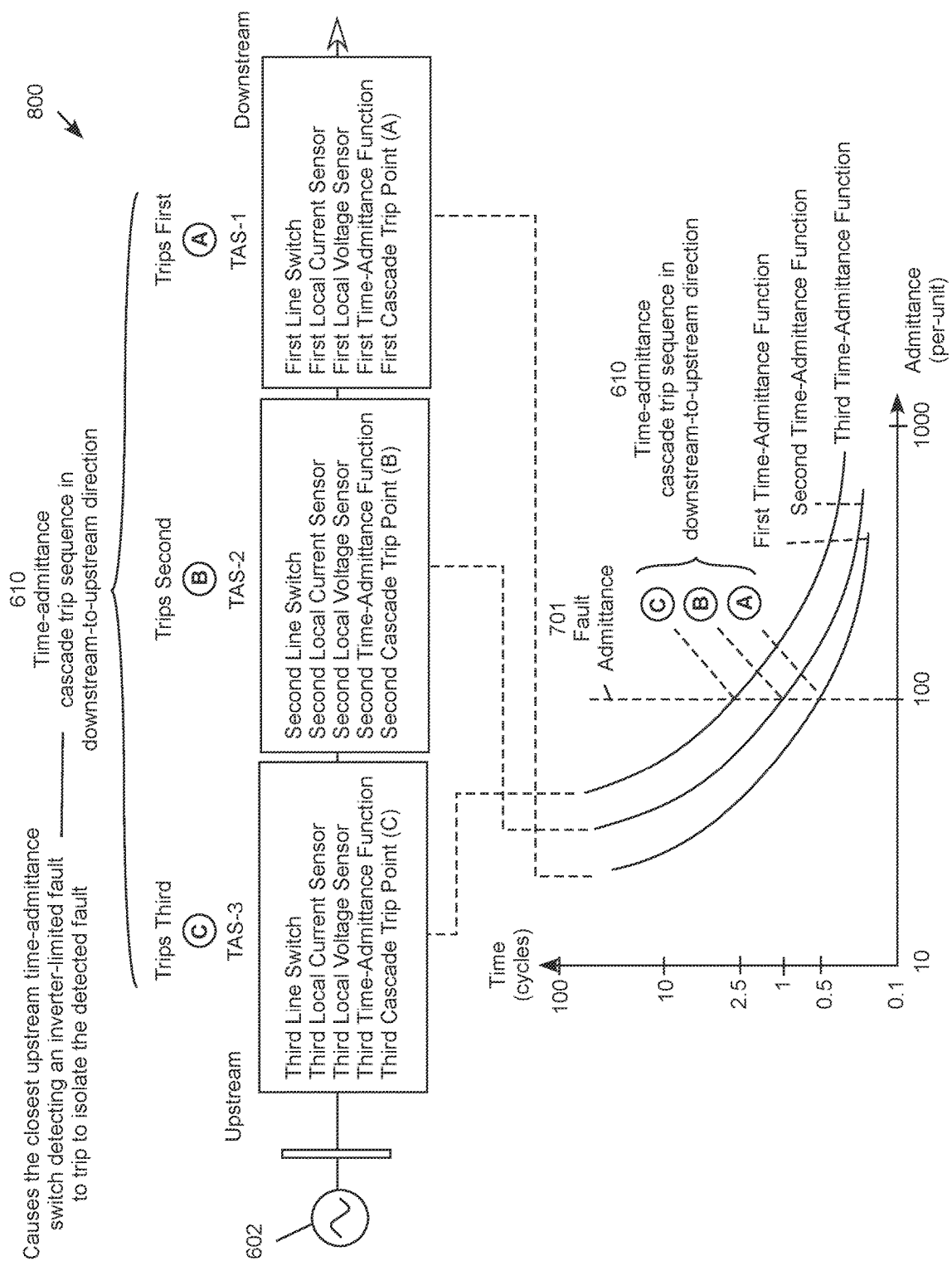
FIG. 8 is a conceptual diagram illustrating trip sequencing of the TAS radial system.

FIG. 8 is a conceptual diagram 800 illustrating the cascade trip sequence 610 of the TAS radial system 600. The first time-admittance switch TAS-1 located furthest downstream from the inverter-limited power source 602 includes a first line switch, a first local current sensor, a first local voltage sensor, a first time-admittance function, and first cascade trip point "A" in response to fault exhibiting a fault admittance 701. The second time-admittance switch TAS-2 located upstream from TAS-1 includes a second line switch, a second local current sensor, a second local voltage sensor, a second time-admittance function, and second cascade trip point "B" in response to fault exhibiting a fault admittance 701. The third time-admittance switch TAS-3 located upstream from TAS-1 includes a third line switch, a third local current sensor, a third local voltage sensor, a third time-admittance function, and third cascade trip point "B" in response to fault exhibiting a fault admittance 701. The cascade trip sequence 610 programs the first, second and third time-admittance switches to trip in a downstream-to-upstream direction TAS-1, TAS-2 and then TAS-3.

Programming the time-admittance switches with the cascade trip sequence 610 in the downstream-to-upstream order causes the closest upstream switch to a fault to trip first, whether that switch is TAS-1, TAS-2 or TAS-3. This occurs, as described further below, because any switch located downstream from a fault does not detect the fault. Each switch only detects upstream faults because a switch upstream from a fault measures a sharp increase in admittance indicating a fault detection, while switch located downstream from a fault measures a sharp decrease in admittance, rather than an increase, which does not indicate fault detection. The time-admittance functions defining the cascade trip sequence 610 therefore produce the desired fault detection and isolation scheme, in which the closest upstream switch to the fault autonomously trips to isolate a fault without the need for communications with the switches. This is further illustrated by the example faults described with reference to FIGS. 9A-9B, 10A-10B and 11A-11B.

Figure 9A:
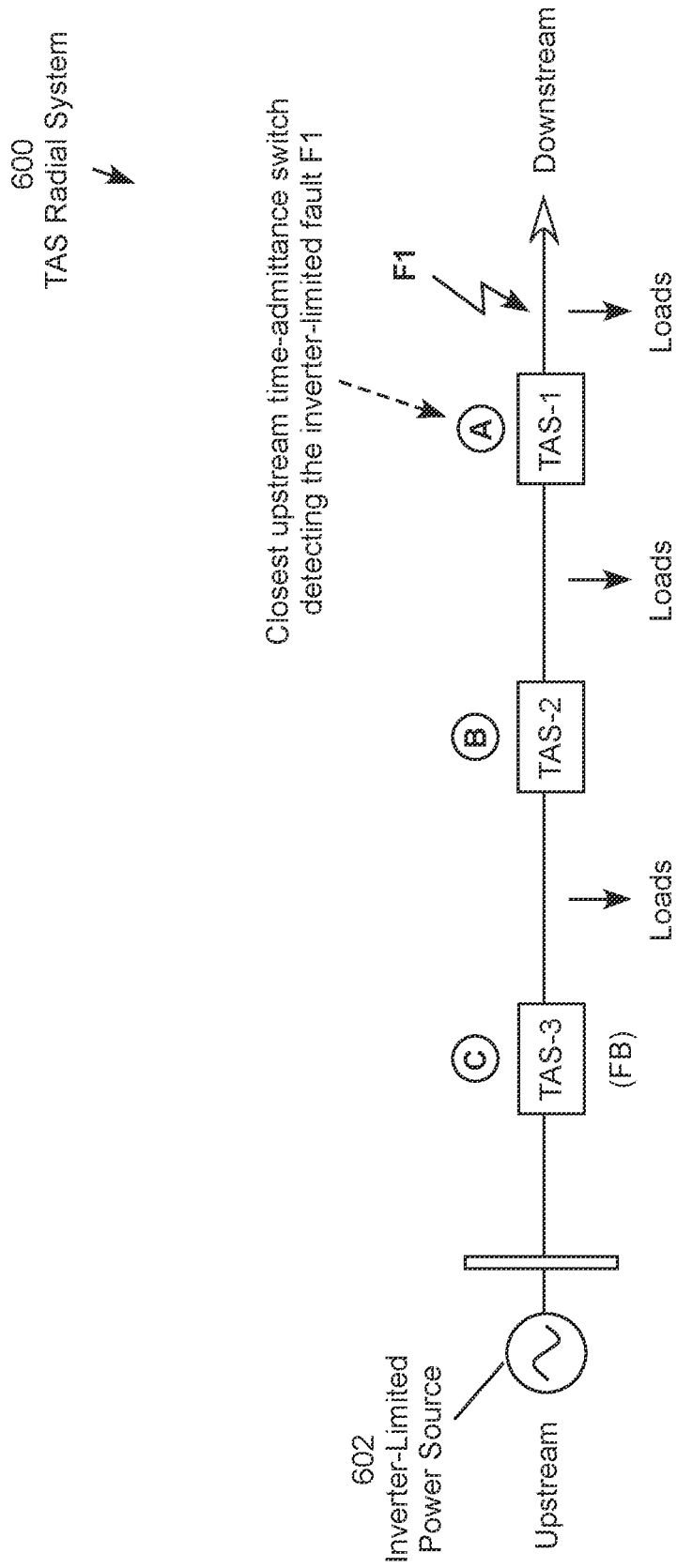
FIG. 9A is a one-line diagram for a radial microgrid experiencing a first fault.
Figure 9B:
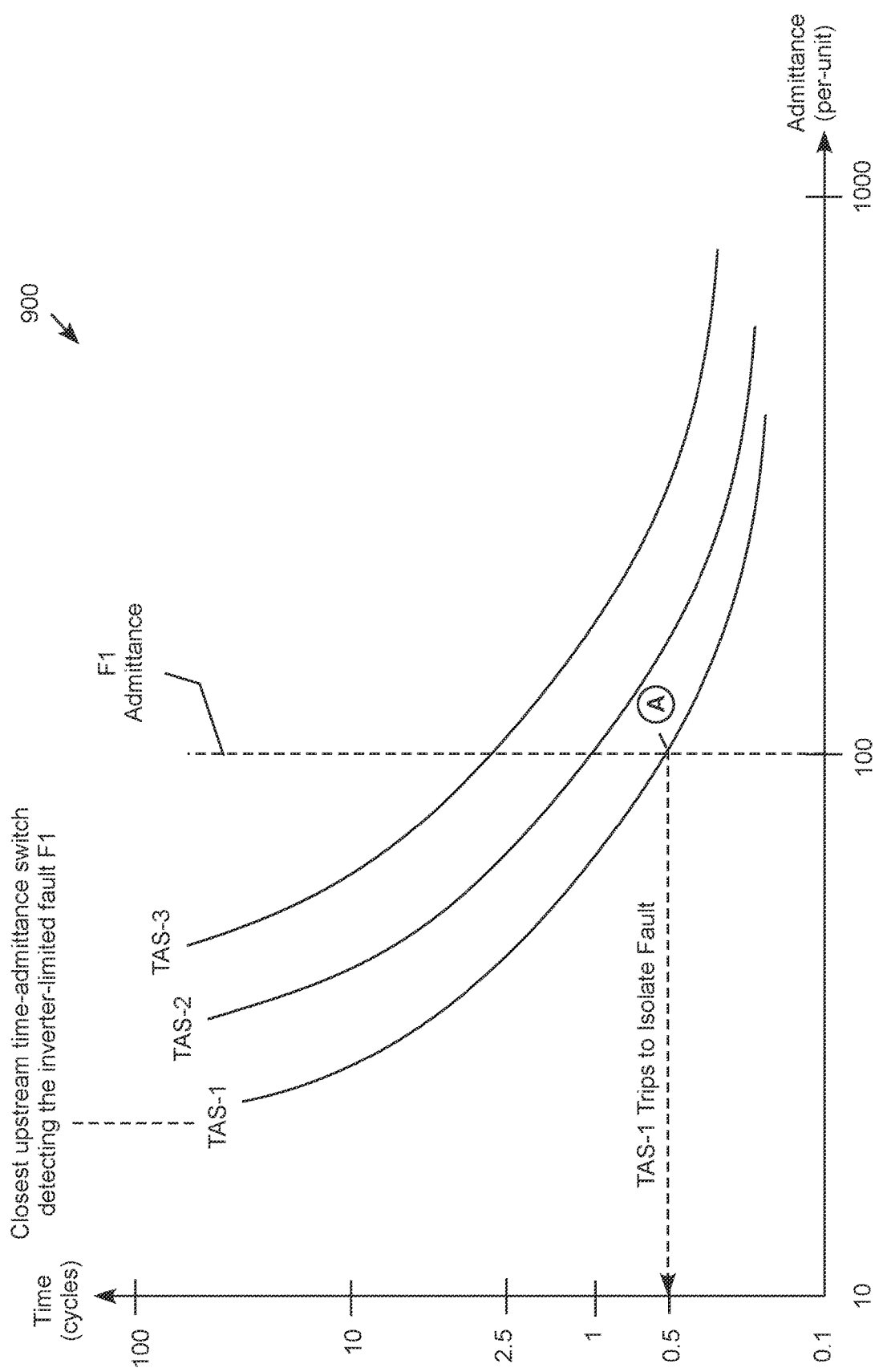
FIG. 9B is a graph illustrating a time-admittance trip response for the first fault.

As a first example, FIG. 9A illustrates the TAS radial system 600 experiencing a first fault F1 downstream from the switch TAS-1, which is the switch located furthest downstream from the inverter-limited power source 602. FIG. 9B is a graph of a time-admittance trip sequence graph 900 illustrating the trip response to the first fault F1. Since the first fault F1 is located downstream from all three switches, they all detect the fault F1 due to a sharp increase in the measured admittance based on their local current and voltage measurements. Since the switch TAS-1 has the shortest trip sequence time (trip sequence position "A"), the cascade trip sequence automatically causes the switch TAS-1 to trip to isolate the first fault F1. As a result, the switch TAS-1, which is the closest switch upstream from the first fault F1, automatically trips to isolate the first fault without the need for communications with the switches.

Figure 10A:
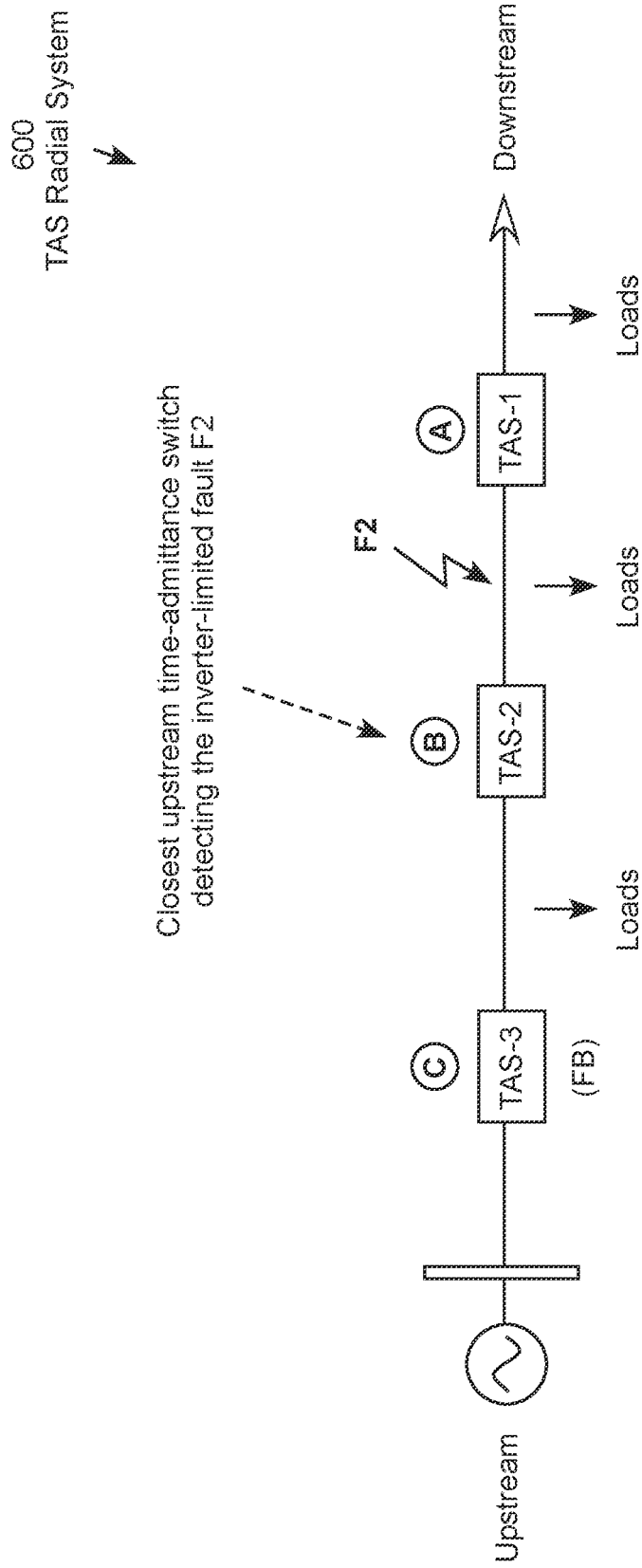
FIG. 10A is a one-line diagram for a radial microgrid experiencing a second fault.
Figure 10B:
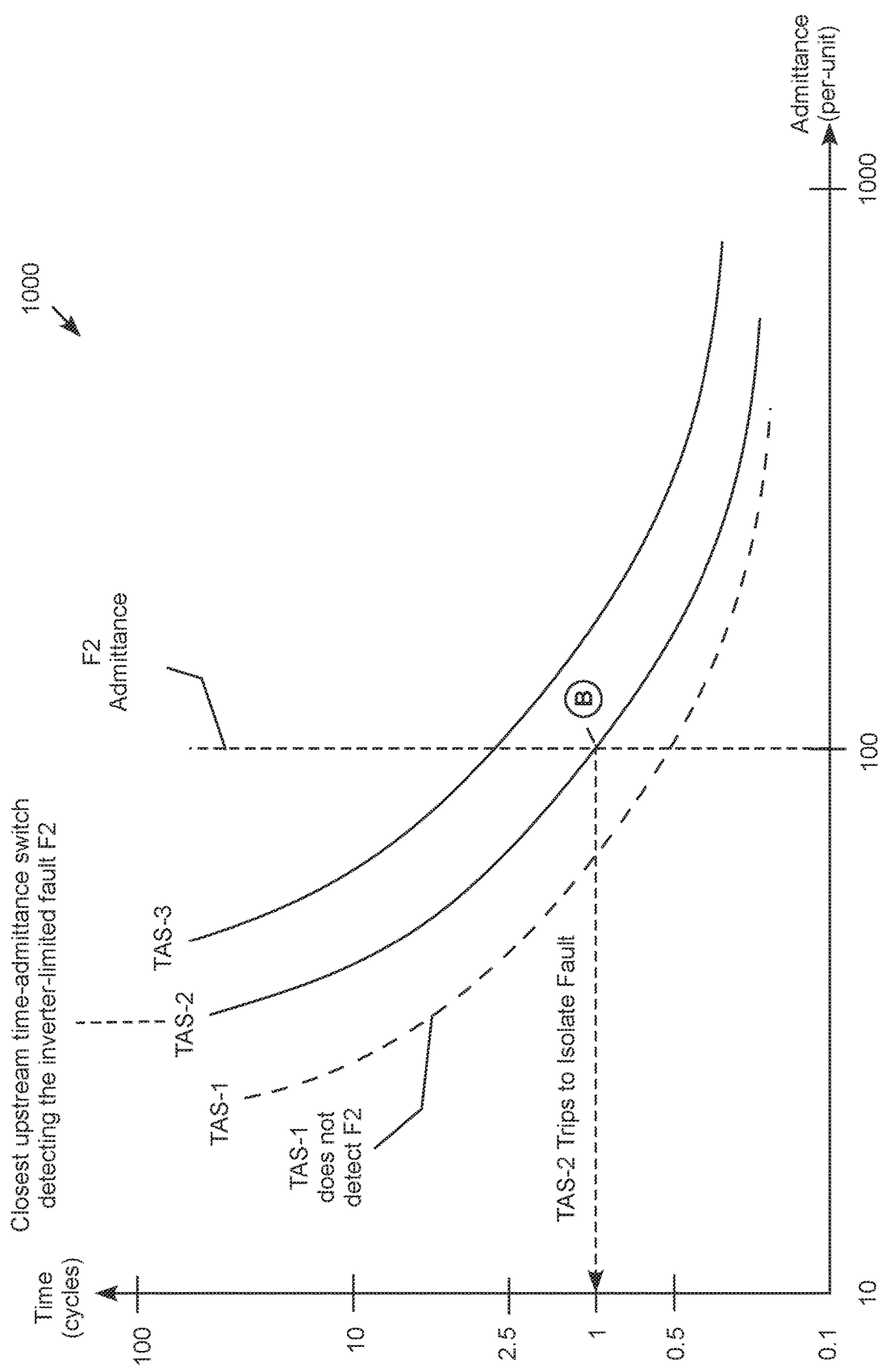
FIG. 10B is a graph illustrating a time-admittance trip response for the second fault.

As a second example, FIG. 10A illustrates the microgrid 600 experiencing a second fault F2 occurring between switches TAS-2 and TAS-1. In other words, the second fault F2 occurs downstream from the switch TAS-3 and TAS-2, and upstream from the switch TAS-1. FIG. 10B is a graph of a time-admittance trip sequence graph 1000 illustrating the trip response to the second fault F2. Since the second fault F2 is located upstream from switch TAS-1, this switch detects a decrease rather than an increase the measured admittance, and therefore does not detect the second fault F2. This is represented by depicting the time-admittance function for the switch TAS-1 as a dashed line. Since switches TAS-2 and TAS-3 are located upstream from the second fault F2, they both detect the second fault. Since the switch TAS-2 has the shorter trip sequence time (cascade trip sequence position "B" as opposed to "C"), the cascade trip sequence automatically causes the switch TAS-2 to trip to isolate the second fault F2. Again, the result is the closest switch upstream from the detected fault, in this example switch TAS-2, automatically trips to isolate the second fault F2 without the need for communications with the switches.

Figure 11A:
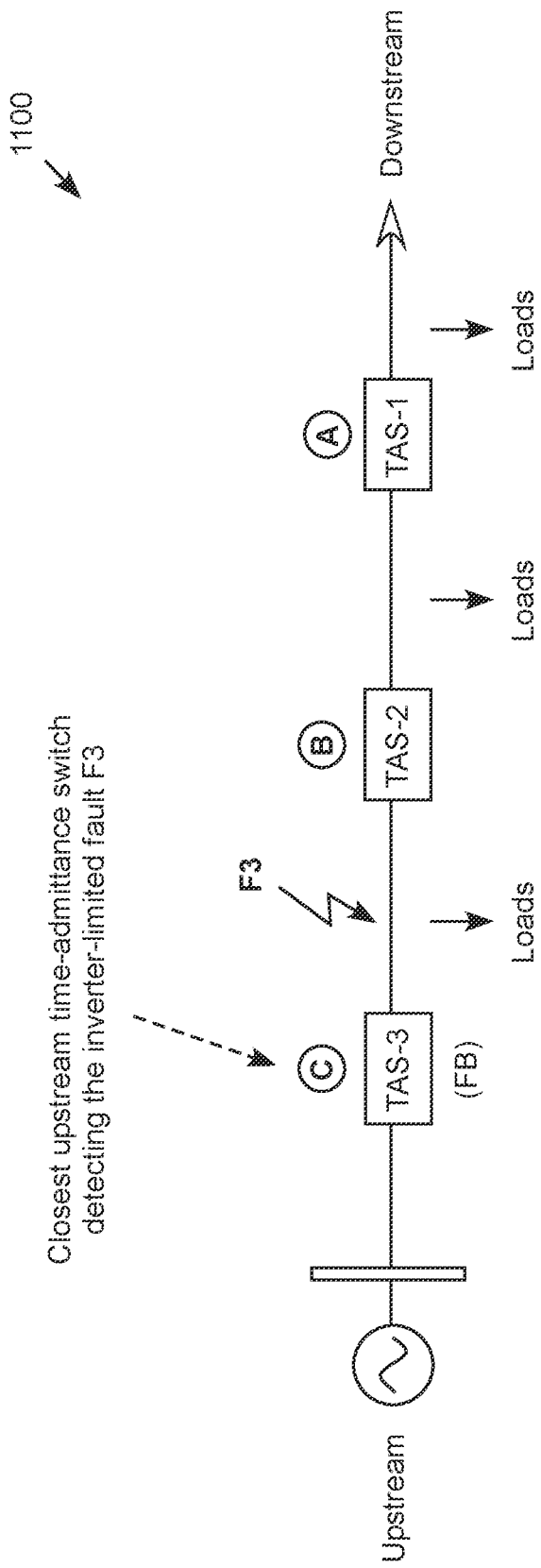
FIG. 11A is a one-line diagram for a radial microgrid experiencing a third fault.
Figure 11B:
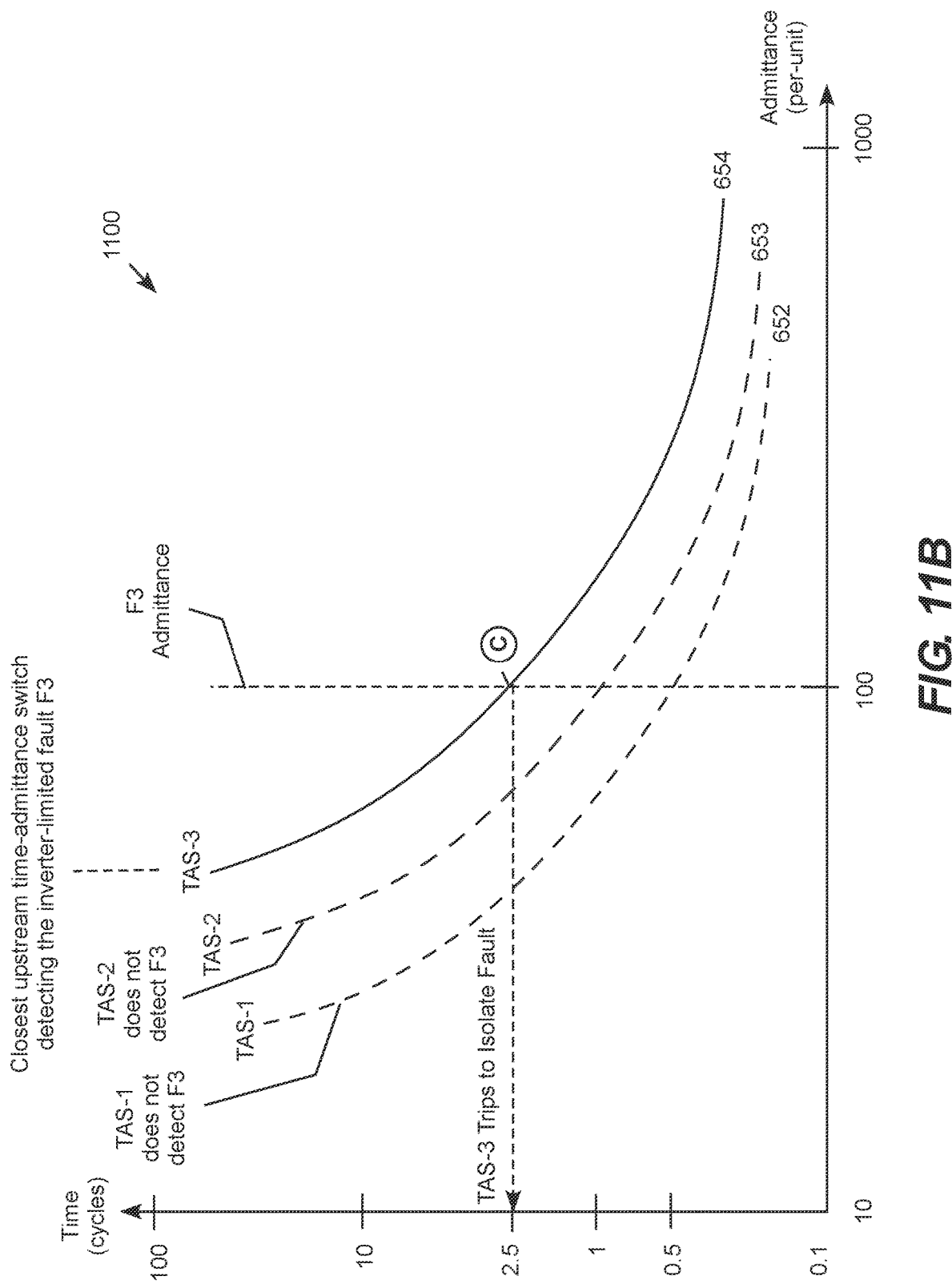
FIG. 11B is a graph illustrating a time-admittance trip response for the third fault.

As a third example, FIG. 11A illustrates the microgrid 600 experiencing a third fault F3 occurring between switches TAS-3 and TAS-2. In other words, the third fault F3 occurs downstream from switch TAS-3 and upstream from switches TAS-2 and TAS-1. FIG. 11B is a graph of a time-admittance trip sequence graph 1100 illustrating the trip response to the third fault F3. Since the third fault F3 is located upstream from the switches TAS-2 and TAS-1, these switches detect a decrease rather than an increase the measured admittance, and therefore do not detect the third fault F3. This is represented by depicting the time-admittance functions for TAS-2 and TAS-1 as dashed lines. Since only switch TAS-3 detects the third fault F3, this is the closest upstream switch to detect the third fault F3. The cascade trip sequence therefore causes the TAS-3 to autonomously trip to isolate the third fault F3 without the need for communications with the switches. Again, the result is the closest switch upstream from the detected fault, in this example TAS-3, automatically trips to isolate the third fault F3 without the need for communications with the switches.

Figure 12:
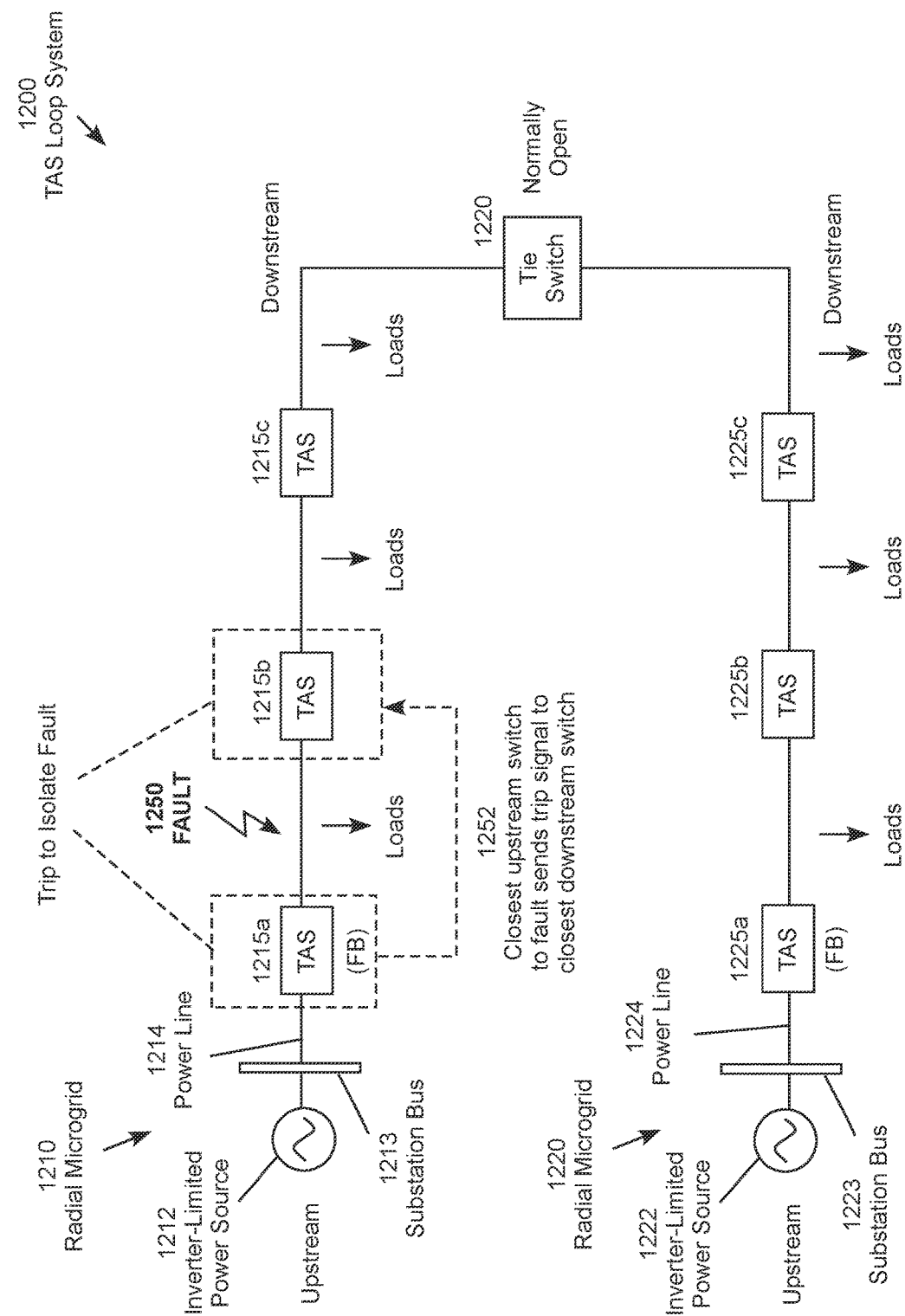
FIG. 12 is a one-line diagram of a TAS loop system for detecting and isolating inverter-limited faults on an inverter-limited microgrid.

The TAS radial system described above operates autonomously without the need for communications with the switches. Adding communications with the switches enables more sophisticated fault isolation techniques including back-feed protocols for microgrid loop configurations. To provide an illustrative example, FIG. 12 is a one-line diagram of a TAS loop system 1200 for detecting and isolating inverter-limited faults on an inverter-limited microgrid. The TAS loop system 1200 includes two radial microgrids 1210 and 1220 connected by a normally-open tie switch 1230. For this example, the first radial microgrid 1210 includes a first inverter-limited power source 1212 connected to a substation bus 1213 feeding a power line 1214 and three time-impedance switches 1215a, 1215-b and 1215c spaced apart on the radial power line. As described with reference to the TAS radial system 600, the time-impedance switches 1215a, 1215-b and 1215c are programmed with cascade trip sequence in downstream-to-upstream direction causing the closest upstream time-impedance switch detecting an inverter-limited fault to trip to isolate fault. Similarly, the second radial microgrid 1220 includes a first inverter-limited power source 1222 connected to a substation bus 1223 feeding a power line 1224 and three time-impedance switches 1225a, 1225-b and 1225c spaced apart on the radial power line. The time-impedance switches 1215a, 1215-b and 1215c are programmed with cascade trip sequence in downstream-to-upstream direction causing the closest upstream time-impedance switch detecting an inverter-limited fault to trip to isolate fault.

Since each radial microgrid autonomously trips the closest upstream switch to a detected fault, the next downstream switch is necessarily the closest downstream switch to the fault. This allows a peer-to-peer communication from the initially tripping switch to the next switch downstream to isolate a detected fault between the closest upstream and closest downstream switches. The example shown in FIG. 12 includes a fault 1250 occurring between time-admittance switches 1215a and 1215b. The closes upstream switch to the fault, in this example time-admittance switch 1215*a*, autonomously detects the fault and trips first. In response to tripping, switch 1215*a* sends a peer-to-peer trip signal 1252 to the next downstream switch, in this example time-admittance switch 1215*b*, instructing that switch to also trip even though this switch did not detect the fault. This results in isolation of the fault 1250 between the closest upstream switch 1215*a* and the closest downstream switch and 1215*c*. The tie switch 1230 detects a loss of voltage causes by switch 1215*c* tripping, which causes the tie switch to close back-feeding the loads served by switch 1215*c*.

The tie switch 1220 and one or more time-admittance switches 1215*a*-1215*c* and 1225*a*-1225*c* may be the same type of programmable recloser switch programmed to operate as a normally-open tie switch as opposed to a normally closed recloser. As a result, any of the recloser switches may be programmed to operate as a normally-open tie switch as opposed to a normally closed recloser, and may be reprogrammed to change their function, as desired.

Figure 13:
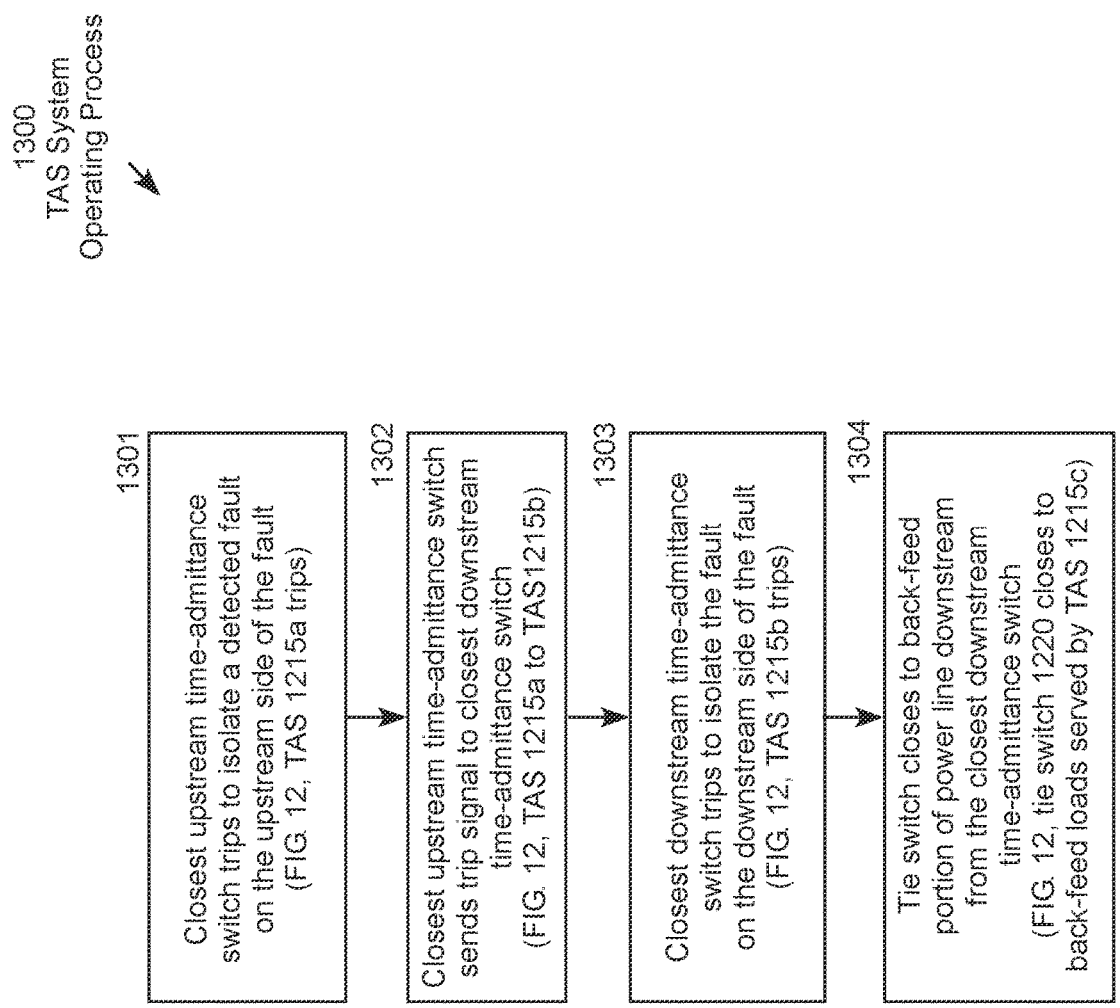
FIG. 13 is a logic flow diagram for operating a TAS loop system.

FIG. 13 is a logic flow diagram for a TAS System operating process 1300 for the fault isolation process described above. In step 1301, the closest upstream time-impedance switch detecting an inverter-limited faults trips to isolate the detected fault on the upstream side (in FIG. 12, the closest upstream switch 1215*a* trips first). Step 1301 is followed by step 1302, in which the closest upstream time-impedance switch sends a trip signal to the closest downstream time-admittance switch (in FIG. 12, the closest upstream switch 1215*a* sends a trip signal to the closest downstream switch 1215*b*). Step 1302 is followed by step 1303, in which the closest downstream switch to the detected fault trips to isolate the fault on the downstream side (in FIG. 12, switch 1215*b* trips to isolate the fault on the downstream side). Step 1303 is followed by step 1304, in which a tie switch closes to back-feed loads downstream from the closest downstream switch to the detected fault (in FIG. 12, tie switch 1220 trips to back-feed the loads served by switch 1215*c*). For example, the tie switch automatically closes to back-feed a portion of the electric power line downstream from the closest downstream time-admittance switch in response to detecting a loss of voltage on one side of the tie switch, while not detecting a loss of voltage on an opposing side of the tie switch. The tie switch is times to operate after the fault detection and isolation procedures of the tie-admittance switches.

In view of the foregoing, it will be appreciated that present invention provides significant improvements distribution automation system for high voltage electric power transmission and distribution systems. The foregoing relates only to the exemplary embodiments of the present invention, and numerous changes may be made therein without departing from the spirit and scope of the invention as defined by the following claims.

The invention claimed is:

1. A fault detection and isolation system for detecting and isolating inverted-limited faults occurring on an electric power line extending downstream from an upstream inverter-limited power source, comprising a plurality of time-admittance switches spaced apart along the electric power line, configured to perform a method comprising:

storing a respective time-admittance function at each time-admittance switch, wherein the time-admittance functions define a cascade trip sequence for the time-admittance switches in a downstream-to-upstream direction;

detecting an inverter-limited fault at one or more of the time-admittance switches upstream from the fault, while not detecting the fault at one or more of the time-admittance switch downstream from the fault;

autonomously tripping a closest upstream time-admittance switch to the fault to isolate the fault on an upstream side of the fault without communication among the time-admittance switches.

2. The fault detection and isolation system of claim 1, wherein the method further comprises:

transmitting a trip signal from the closest upstream time-admittance switch to the fault to a closest downstream time-admittance switch to the fault;

tripping the closest downstream time-admittance switch to the fault to isolate the fault on a downstream side of the fault.

3. The fault detection and isolation system of claim 2 further comprising a tie switch, wherein the method further comprises:

in response to detecting a loss of voltage on one side of the tie switch, while not detecting a loss of voltage on an opposing side of the tie switch, closing the tie switch to back-feed a portion of the electric power line downstream from the closest downstream time-admittance switch to the fault.

4. The fault detection and isolation system of claim 1, wherein:

each time-admittance switch further comprises a respective local current sensor;

each time-admittance switch further comprises a respective local voltage sensor;

the method further comprises the closest upstream time-admittance switch to the fault determining a fault admittance based on a local current measurement received from its respective local current sensor and a local voltage measurement received from its respective local voltage sensor;

the method further comprises the closest upstream time-admittance switch to the fault detecting the fault based the fault admittance and its respective time-admittance function.

5. The fault detection and isolation system of claim 4, wherein the method further comprises:

the closest upstream time-admittance switch to the fault determining an allowed fault time based the fault admittance and its respective time-admittance function;

the closest upstream time-admittance switch to the fault setting a trip timer based on the allowed fault time.

6. The fault detection and isolation system of claim 5, wherein the method further comprises:

the closest upstream time-admittance switch to the fault tripping to isolate the fault upon expiration of the trip timer.

7. A fault detection and isolation system for detecting and isolating inverted-limited faults occurring on an electric power line extending downstream from an upstream inverter-limited power source, comprising a plurality of time-admittance switches spaced apart along the electric power line, each time-admittance switch comprising a switch controller and a non-transitory computer storage medium storing computer-executable instructions that, when executed by the switch controllers, causes the switch controllers to collectively perform a method comprising:

storing a respective time-admittance function at each time-admittance switch, wherein the time-admittance functions define a cascade trip sequence for the time-admittance switches in a downstream-to-upstream direction;

detecting an inverter-limited fault at one or more of the time-admittance switches upstream from the fault, while not detecting the fault at one or more of the time-admittance switch downstream from the fault;

autonomously tripping a closest upstream time-admittance switch to the fault to isolate the fault on an upstream side of the fault without communication among the time-admittance switches.

8. The fault detection and isolation system of claim 7, wherein the method further comprises:

transmitting a trip signal from the closest upstream time-admittance switch to the fault to a closest downstream time-admittance switch to the fault;

tripping the closest downstream time-admittance switch to the fault to isolate the fault on a downstream side of the fault.

9. The fault detection and isolation system of claim 8, further comprising a tie switch comprising a tie switch controller and a non-transitory computer storage medium storing computer-executable instructions that, when executed by the tie switch controller, causes the tie switch controllers to perform a method comprising:

in response to detecting a loss of voltage on one side of the tie switch, while not detecting a loss of voltage on an opposing side of the tie switch, closing the tie switch to back-feed a portion of the electric power line downstream from the closest downstream time-admittance switch to the fault.

10. The fault detection and isolation system of claim 7, wherein:

each time-admittance switch further comprises a respective local current sensor;

each time-admittance switch further comprises a respective local voltage sensor;

the method further comprises the closest upstream time-admittance switch to the fault determining a fault admittance based on a local current measurement received from its respective local current sensor and a local voltage measurement received from its respective local voltage sensor;

the method further comprises the closest upstream time-admittance switch to the fault detecting the fault based the fault admittance and its respective time-admittance function.

11. The fault detection and isolation system of claim 10, wherein the method further comprises:

the closest upstream time-admittance switch to the fault determining an allowed fault time based the fault admittance and its respective time-admittance function;

the closest upstream time-admittance switch to the fault setting a trip timer based on the allowed fault time.

12. The fault detection and isolation system of claim 11, wherein the method further comprises:

the closest upstream time-admittance switch to the fault tripping to isolate the fault upon expiration of the trip timer.

13. A time-admittance switch comprising a local current sensor, a local voltage measurement, a switch controller, and a non-transitory computer storage medium storing computer-executable instructions that, when executed by the switch controller, causes the switch controller to perform a method comprising:

storing a time-admittance function;

receiving a local current measurement from the local current sensor;

receiving a local voltage measurement from the local voltage sensor;

computing a measured admittance based on the local current measurement and the local voltage measurement;

detecting an inverter-limited fault downstream from the time-admittance switch based on the measured admittance and the time-admittance function;

autonomously tripping to isolate the fault on an upstream side of the fault without communication from another time-admittance switches or a supervisory control system.

14. The time-admittance switch of claim 13, wherein the method further comprises transmitting a trip signal to a closest downstream time-admittance switch to the fault causing the closest downstream time-admittance switch to the fault to trip to isolate the fault on a downstream side of the fault.

15. The time-admittance switch of claim 14, wherein the method further comprises causing a tie switch to close to back-feed a portion of the electric power line downstream from the closest downstream time-admittance switch.

* * * * *